UNITED STATES PATENT OFFICE.

NATHANIEL C. FOWLER, OF BOSTON, MASSACHUSETTS, ASSIGNOR TO THE INDESTRUCTIBLE SAFE AND FIRE PROOF COMPANY, OF WEST VIRGINIA.

FIRE-PROOF COMPOUND AND SHEETS MADE THEREOF.

SPECIFICATION forming part of Letters Patent No. 309,940, dated December 30, 1884.

Application filed January 3, 1884. (No specimens.)

*To all whom it may concern:*

Be it known that I, NATHANIEL C. FOWLER, of Boston, in the county of Suffolk and State of Massachusetts, have invented a new and useful or Improved Fire-Proof Compound and Sheets Made Thereof, which invention will be hereinafter fully and clearly described and claimed.

My invention relates to a material or composition of matter to be employed for lining safes and deposit-vaults, the construction of treasure-boxes, the fireproofing of buildings, and other analogous uses, where resistance to heat by means of a non-conducting body may render it available; and it consists in a compound whose base is wood or coal ashes, prepared as hereinafter stated. I preferably employ coal-ashes, which I prepare by sifting or equivalent means, to separate therefrom the unconsumed particles of coal and the silicious matter. An effectual method of producing such separation is to pass the ashes through rotary cylindrical screens of the requisite fineness of mesh, and which are provided in the well-known manner with internal screw-conveyers to carry off the unconsumed coal and silicious matter which cannot pass through the meshes.

For the purpose of plastering walls and ceilings and other parts of rooms, to render them proof against fires, such as usually occur therein, I employ of ashes thus sifted eighty-five per cent., and of calcined plaster-of-paris ten per cent., as ascertained by weight, and to these I add a proper quantity—say five per cent.—of fibrilized asbestus or animal or vegetable fiber; and I also add, after thoroughly dry-mixing the above ingredients, a sufficient quantity of water, and mix and incorporate the whole together until a homogeneous mass is produced, which may be applied as ordinary plastering-mortar; but when the highest degree of protection against fire is requisite, I take of ashes, prepared as above, eighty-five per cent.; of fibrilized asbestus or vegetable or animal fiber, five per cent.; of lamp-black, from one-half of one per cent. to two and one-half per cent.; of pulverized pumice-stone, three per cent.; and of calcined plaster-of-paris, about five per cent., as determined by weight. These ingredients I perfectly mix and incorporate together in a dry condition, and when required for use I add the requisite quantity of water to produce, when mixed and worked together, a plastic mass, which may be used either as mortar, or which may be poured upon a table or other form and dried to produce sheets, tablets, or other forms of the required thickness and area.

Aside from the low cost of the ashes, which involves only the expense of gathering and screening or separating, they produce, when mixed as a mortar and spread and dried or formed into sheets, a body so thoroughly and uniformly porous as to constitute a resistant to heat of great value and efficiency, and the addition thereto of calcined plaster-of-paris serves as a binder, in that it prevents the disintegration liable to result from shocks and vibrations or from extreme heat.

Although asbestus is not a non-conductor of heat, yet when reduced to a finely-fibrilized condition and uniformly mingled in the mass, its heat-conducting effect is but slight, and it is of efficient service in rendering the applied material less liable to fracture and disintegration; but where heat-resisting is of primal importance, I prefer hair or other vegetable or animal fiber, as it not only strengthens the mass, but when subjected to heat is slowly consumed, thereby serving the double purpose of producing carbonic-acid gas in minute jets, which retard the advance of heat, and as consumed leaving additional air-cells in the mass.

The effect of lamp-black or other finely-divided carbon is to greatly increase the number of air-cells when the mass is subjected to heat, as the decomposition thereby of the particles of lamp-black leaves corresponding air-cells, besides which the carbonic-acid gas set free by such decomposition tends to resist and retard the advance of heat.

The advantage derived from the employment of pulverized pumice-stone consists in the fact that when the composition is subjected to the action of a high degree of heat that ingredient becomes fused or softened to an extent to cause it to flow on the surface, and thus produce a hard smooth face calculated to protect the material from abrasion. When a hard and polished surface is required and resistance to a high temperature is not of paramount importance, and ashes and plaster are alone employed, a greater proportion of calcined plaster-of-paris, rising to as high as one-half, may be employed, and the proportions of the several ingredients may be varied from that herein stated as the special conditions in which my composition is to be employed may render advisable.

In lieu of the ashes of wood or coal, clay, or fossil-earth substantially free from silicates, or from which silicates can be readily and effectually separated, may be employed; but I deem ashes to be preferable.

In sifting the ashes, I employ sieves or screens with meshes ranging from two to two hundred to the lineal inch.

When ashes and plaster-of-paris are employed without the lamp-black or pumice-stone, fiber may be dispensed with, unless the required degree of cohesion and strength of the mass should render its employment necessary.

Although I prefer the method of thoroughly mixing the ingredients of my composition in a dry condition, yet they may be moistened before thorough incorporation of the several parts is effected, especially when the mixing occurs near the place of its application; but in case the compound is to be transported to any distance the mixing should occur when in a thoroughly dry condition, as the moistening should not long precede its application.

When my compound is applied to floors or other horizontal surfaces which will support it, fiber may be dispensed with.

When the compound is employed in the construction of treasure-boxes, the lining of safes, or in other positions where it will be molded in required shapes and forms to adapt it to the space it will occupy to resist high degrees of heat, the employment of pulverized pumice-stone is of great utility and efficiency.

I claim as my invention—

1. The new fire-proof compound, composed of sifted ashes or the described earthy substitutes, and calcined plaster-of-paris, compounded in the manner and proportions substantially as specified.

2. The new fire-proof compound, composed of sifted ashes or the described earthy substitutes, calcined plaster-of-paris, and finely-fibrilized asbestus, or, in lieu thereof, animal or vegetable fiber, compounded in the manner and proportions substantially as described.

3. The new fire-proof compound, consisting of sifted ashes or the described earthy substitutes, calcined plaster-of-paris, finely-pulverized pumice-stone, lamp-black, or other finely-divided carbonaceous material, and finely-fibrilized asbestus, or, in lieu thereof, animal or vegetable fiber, the whole compounded in the manner and proportions substantially as specified.

4. The new composition of matter for a fire-proof compound, consisting of sifted ashes or the described earthy substitutes, calcined plaster-of-paris, finely-pulverized pumice-stone, lamp-black, or other finely-divided carbonaceous material, and finely-fibrilized asbestus, or, in lieu thereof, animal or vegetable fiber, the whole to be in proportion substantially as stated, and to be prepared, mixed, wet, and incorporated into a plastic mass preparatory to use in a mortar-like condition, substantially as specified.

5. As a new article of manufacture, sheets, blocks, or other forms of fire-proof material produced by compounding, in proportions substantially as described, sifted ashes or the described earthy substitutes, calcined plaster-of-paris, finely-pulverized pumice-stone, lamp-black, or other finely-divided carbonaceous material, and finely-fibrilized asbestus, or, in lieu thereof, animal or vegetable fiber, the whole to be in the proportions and to be prepared for use substantially as specified.

NATHANIEL C. FOWLER.

Witnesses:
T. W. PORTER,
H. A. FULLER.